United States Patent
Ramaiah et al.

(10) Patent No.: US 12,223,027 B2
(45) Date of Patent: Feb. 11, 2025

(54) CENTRALIZED MANAGEMENT OF ADDON BASEBOARD MANAGEMENT CONTROLLERS (BMCS) THROUGH AN INTEGRATED SERVER REMOTE ACCESS CONTROLLER USING SECURE TOKENS

(71) Applicant: Dell Products, L.P., Round Rock, TX (US)

(72) Inventors: Mahesh Babu Ramaiah, Bangalore (IN); Ajay Shenoy, Bangalore (IN); Farhan Syed, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 263 days.

(21) Appl. No.: 17/814,993

(22) Filed: Jul. 26, 2022

(65) Prior Publication Data

US 2024/0037206 A1     Feb. 1, 2024

(51) Int. Cl.
| | |
|---|---|
| *G06F 21/33* | (2013.01) |
| *G06F 1/3203* | (2019.01) |
| *G06F 11/32* | (2006.01) |
| *H04L 9/32* | (2006.01) |
| *H04L 9/40* | (2022.01) |

(52) U.S. Cl.
CPC ............ *G06F 21/33* (2013.01); *G06F 1/3203* (2013.01); *G06F 11/321* (2013.01); *H04L 9/3239* (2013.01); *H04L 63/04* (2013.01)

(58) Field of Classification Search
CPC .. G06F 11/321; G06F 1/3203; G06F 12/1466; H04L 41/0686; H04L 63/04
See application file for complete search history.

(56) References Cited

U.S. PATENT DOCUMENTS

| | | | |
|---|---|---|---|
| 2013/0265328 A1* | 10/2013 | Lambert | G06F 11/321 345/629 |
| 2016/0094359 A1* | 3/2016 | Bidaralli | H04L 41/0686 709/224 |
| 2017/0083457 A1* | 3/2017 | Khemani | G06F 12/1466 |
| 2018/0287791 A1* | 10/2018 | Basavarajaiah | H04L 63/04 |
| 2018/0307288 A1* | 10/2018 | Huang | G06F 1/3203 |
| 2019/0356486 A1* | 11/2019 | Vishwanath | H04L 9/3239 |

* cited by examiner

*Primary Examiner* — Barbara B Anyan
(74) *Attorney, Agent, or Firm* — Fogarty LLP

(57) ABSTRACT

Centralized management of a Data Processing Unit (DPU) Baseboard Management Controller (BMC) through an integrated server remote access controller (iRAC) may include embedding a secure token in a communication from the iRAC to a BMC of a DPU, the secure token authorizing the iRAC to the DPU BMC and authorizing the DPU BMC to the iRAC. The secure token may include a first layer token authorizing the iRAC to the DPU and authorizing the DPU to the iRAC and a second layer token authorizing the DPU to the DPU BMC and authorizing the BMC to the DPU. Alternatively, the secure token may be generated by the iRAC generating an initial token authorizing the iRAC to the DPU and authorizing the DPU to the iRAC, the iRAC embedding the initial token in a request to the DPU for a resource of the DPU BMC and the DPU generating the secure token.

15 Claims, 8 Drawing Sheets

CENTRALIZED MANAGEMENT OF ADDON BASEBOARD MANAGEMENT CONTROLLERS (BMCS) THROUGH AN INTEGRATED SERVER REMOTE ACCESS CONTROLLER USING SECURE TOKENS

FIELD

This disclosure relates generally to Information Handling Systems (IHSs), and, more specifically, to centralized management of addon Baseboard Management Controllers (BMCs) through an integrated server remote access controller using secure tokens.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

System management clients (i.e., client users managing one or more servers in a (modular) IHS (server) chassis, or the like) may use a protocol providing a Representational State Transfer constrained (RESTful) interface (e.g., a Redfish API). This Redfish API, or the like, may be used to communicate with a Redfish server, or the like, on an integrated server remote access controller (e.g., an IHS integrated remote access controller or an integrated server remote access controller), or the like. In turn, the integrated server remote access controller may communicate with other Redfish servers, or the like, running on BMCs of various devices, such as, by way of example, BMCs on Graphics Processing Unit (GPU) cards that connects to the integrated server remote access controller over a Universal Serial Bus-Network Interface Card (USB-NIC) interface, BMCs on Data Processing Unit (DPU) cards that connect over Reduced Media-Independent Interface (RMII) Based Transport (RBT), etc.

SUMMARY

Embodiments of centralized management of addon Baseboard Management Controllers (BMCs) through an integrated server remote access controller using secure tokens are described. In an illustrative, non-limiting example a Data Processing Unit (DPU) may be deployed in an Information Handling System (IHS) server chassis, and the DPU may include a(n) (addon) BMC. An integrated server (chassis) remote access controller integrated into the server chassis (iRAC) may be configured to embed a secure token in a communication from the iRAC to the BMC of the DPU, the secure token authorizing the iRAC to the BMC of the DPU and authorizing the BMC of the DPU to the iRAC.

The secure token may be multilayer, and may have a first layer token authorizing the iRAC to the DPU and authorizing the DPU to the iRAC, and have a second layer token authorizing the DPU to the BMC of the DPU and authorizing the BMC of the DPU to the DPU. In such implementations, communication between the iRAC and the DPU is authorized and communication between the DPU and the BMC of the DPU is authorized, and the iRAC is configured to generate the first layer token and embed the first layer token in a request to the DPU for a resource of the BMC of the DPU, while the DPU is configured to recognize the request as a request for the resource of the BMC of the DPU, generate the second layer token and the secure token, in response to recognition of the request as a request for the resource of the BMC of the DPU, and to pass the secure token to the iRAC for use in new requests. Thereafter, the iRAC embeds the secure token in new requests to the DPU for a resource of the BMC of the DPU, and the DPU is configured to parse the secure token for the second layer token, check a found second layer token against cached second layer tokens authorizing the DPU to the BMC of the DPU and authorizing the BMC of the DPU to the DPU, and proxy the new request to the BMC of the DPU using the found second layer token, in response to a match of the found second layer token to a cached second layer token. Whereupon, the BMC of the DPU processes the new request and responds to the new request, back to the DPU, for the DPU to communicate a resulting response to the new request back to the iRAC.

Alternatively, again, where communication between the iRAC and the DPU is authorized and communication between the DPU and the BMC of the DPU is authorized, the iRAC may generate an initial token authorizing the iRAC to the DPU and authorizing the DPU to the iRAC and embed the initial token in request for a resource of the BMC of the DPU, and the DPU may communicate with the BMC of the DPU to create a bootstrap credential, generate the secure token, and share the secure token with the iRAC for use in direct communications between the iRAC and the BMC of the DPU. The secure token may include a source of origin and secret key map retrieved from the iRAC and the BMC of the DPU. Thereafter, the iRAC may embed the secure token in a new request from the iRAC to the BMC of the DPU for a resource from the BMC of the DPU, and the BMC of the DPU may validate the secure token, process the new request, in response to validation of the secure token, and communicate a resulting response to the new request back to the iRAC.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may, in accordance with embodiments of the present systems and methods, be a server (e.g., compute sled, storage sled, blade server, etc.), an Enclosure Controller (EC) (e.g., an integrated modular server chassis remote access controller), a Graphics Processing Unit (GPU) card, a Data Processing Unit (DPU) card (e.g., a "smart" network interface controller (smart NIC)), or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices. The IHS may also include one or more buses operable to transmit communications between the various hardware components.

Embodiments of the present systems and methods are directed to centralized management of addon Baseboard Management Controllers (BMCs), such as BMCs of GPU cards, DPU cards (e.g., smart NICs), or the like. For purposes of description, such GPU cards, DPU cards, smart NICs, or the like, will be referred to herein, individually, as a "DPU."

Figure 1:
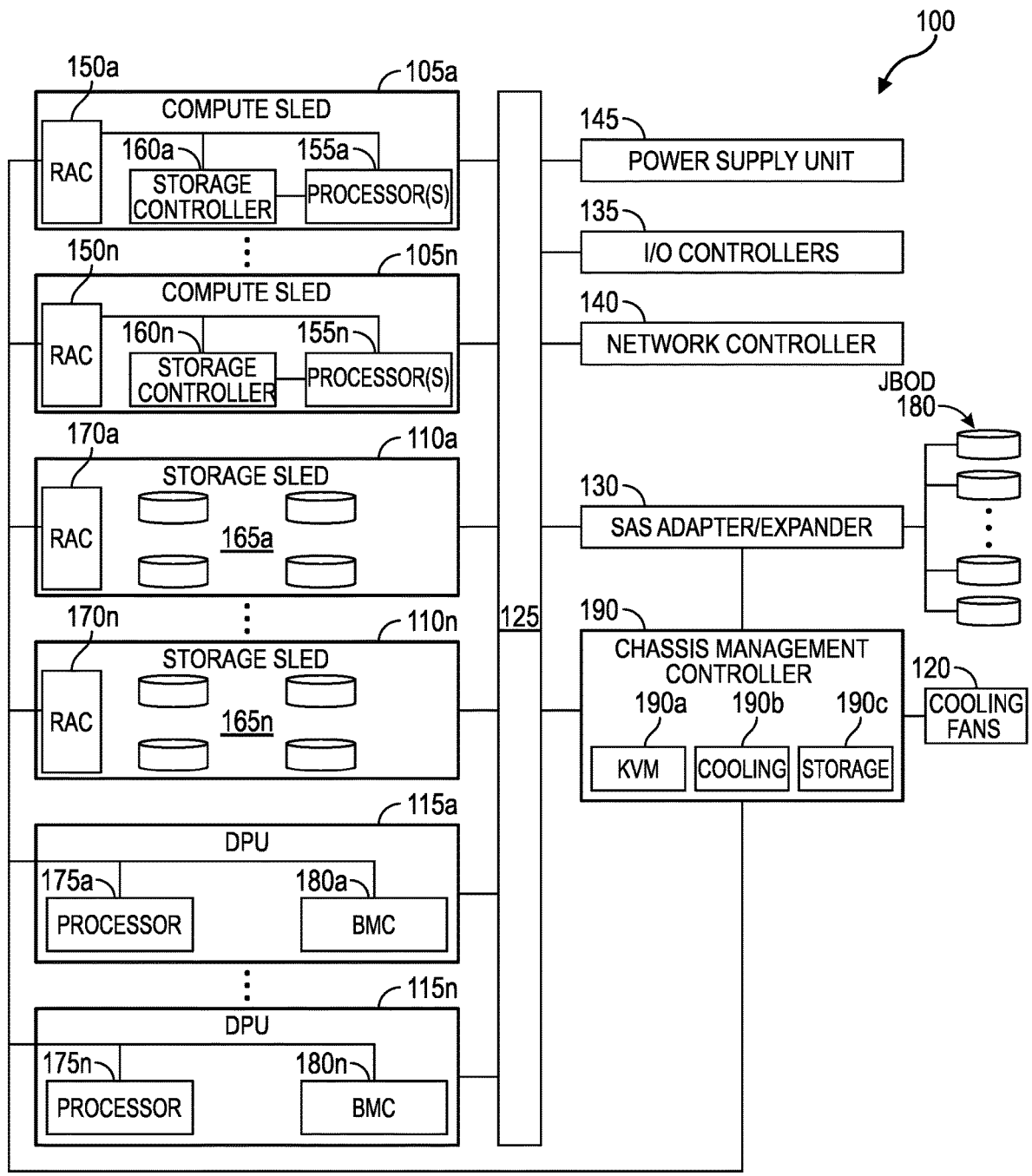
FIG. 1 is a diagram illustrating certain components of an example chassis, according to some embodiments, for tracking hardware components of the chassis.

FIG. 1 is a block diagram illustrating certain components of an example IHS chassis 100 that may be configured to implement systems and methods for centralized management of DPU (i.e., addon) BMCs through an integrated server remote access controller, according to some embodiments. Chassis 100 may have one or more compute sleds 105a-n, one or more storage sleds 110a-n and/or one or more DPUs 115a-115n, deployed therein. For example, chassis 100 may be a modular IHS chassis, such as, by way of example a Dell® PowerEdge™ MX7000 modular chassis. Embodiments of chassis 100 may include a wide variety of different hardware configurations. Such variations in hardware configuration may result from chassis 100 being factory assembled to include components specified by a customer that has contracted for manufacture and delivery of chassis 100, or such variations in hardware configuration may result from customer (directed) installation of various compute sleds, storage sleds, DPUs, or the like in chassis 100 (over time).

Chassis 100 may include one or more bays that each receive an individual sled (that may be additionally or alternatively referred to as a tray, blade, and/or node), DPU, or the like, such as compute sleds 105a-n, storage sleds 110a-n, DPUs 115a-n, etc. Chassis 100 may support a variety of different numbers (e.g., 4, 8, 16, 32), sizes (e.g., single-width, double-width) and physical configurations of bays. Other embodiments may include additional types of sleds or DPUs that provide various types of storage and/or processing capabilities. Other types of sleds or DPUs may provide power management and networking functions. Sleds or DPUs may be individually installed and removed from chassis 100, thus allowing the computing and storage capabilities of a chassis to be reconfigured by swapping the sleds or DPUs with different types of sleds without affecting the operations of the other sleds or DPUs installed in the chassis 100.

Multiple chassis 100 may be housed within a rack. Data centers may utilize large numbers of racks, with different types of chassis installed in the various configurations of racks. The modular architecture provided by the sleds, DPUs, chassis, and rack allow for certain resources, such as cooling, power and network bandwidth, to be shared by compute sleds 105a-n, storage sleds 110a-n, and DPUs 115a-n thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within chassis 100 that is housed within the rack. Chassis 100 may alternatively or additionally include one or more cooling fans 120 that may be similarly operated to ventilate heated air from within sleds 105a-n, 110a-n, DPUs 115a-n, etc. installed within the chassis. Rack and chassis 100 installed within the rack may utilize various configurations and combinations of cooling fans to cool sleds 105a-n, 110a-n, DPUs 115a-n and other components housed within chassis 100.

Sleds 105a-n, 110a-n, DPUs 115a-n, etc. may be individually coupled to chassis 100 via connectors that correspond to the bays provided by chassis 100 and that physically and electrically couple an individual sled to backplane 125. Chassis backplane 125 may be a printed circuit board that includes electrical traces and connectors that are configured to route signals between the various components of chassis 100 that are connected to backplane 125.

Backplane 125 may include various additional components, such as cables, wires, midplanes, backplanes, connectors, expansion slots, and multiplexers. In certain implementations, backplane 125 may be a motherboard that includes various electronic components installed thereon. Such components installed on backplane 125 may include components that implement all or part of the operations described with regard to the Serial Attached SCSI (SAS) expander 130, I/O controllers 135, network controller 140 and power supply unit (PSU) 145.

Figure 2:
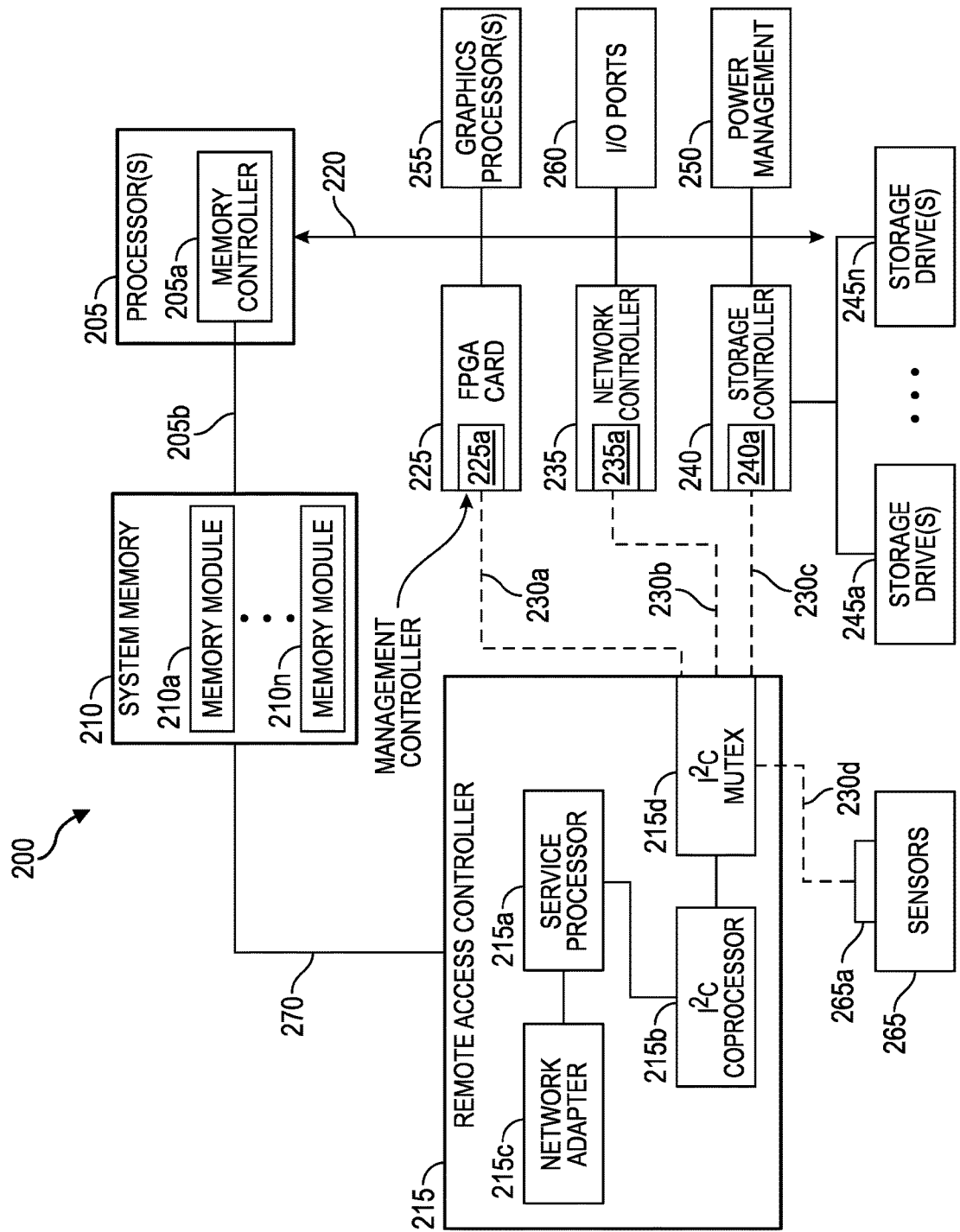
FIG. 2 is a diagram illustrating certain components of an example IHS configured, according to some embodiments, for tracking hardware components of the IHS.

Each of compute sleds 105a-n may be an IHS such as described with regard to IHS 200 of FIG. 2. Each of compute sleds 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. Compute sleds 105a-n may be configured for general-purpose computing or may be optimized for specific computing tasks.

As illustrated, each of compute sleds 105a-n may include a respective Remote Access Controller (RAC) 150a-n. Each of RACs 150a-n may be a BMC, or the like and provides capabilities for remote monitoring and management of a corresponding one of compute sleds 105a-n. In support of these monitoring and management operations, RACs 150a-n may utilize both in-band and sideband (i.e., out-of-band) communications with various components of compute sleds 105a-n and chassis 100. RACs 150a-n may collect various types of sensor data, such as collecting temperature sensor readings that are used in support of airflow cooling of the chassis 100 and the sleds 105a-n, 110a-n, DPUs 115a-n, etc. In addition, each of RACs 150a-n may implement various functions related to compute sleds 105a-n that utilize sideband bus connections with various internal components thereof. As a non-limiting example of a RAC, the integrated Dell RAC (iDRAC) from Dell® is embedded within Dell PowerEdge™ servers and provides functionality that helps information technology (IT) administrators deploy, update, monitor, and maintain servers remotely. Each of the compute sleds 105a-n may utilize one or more system processors 155a-n, that may be referred to as CPUs (central processing units) and that may be assigned computing tasks, such as via respective RAC 150a-n. In some embodiments, CPUs 155a-n may each include a plurality of processing cores that may be separately assigned computing tasks. Each of the compute sleds 105a-n may also include respective one of storage controllers 160a-n that may be utilized to access storage drives that are accessible via chassis 100. Some individual storage controllers 160a-n may provide support for Redundant Array of Independent Disks (RAID) configurations of logical and physical storage drives, such as storage drives provided by storage sleds 110a-n. Some or all individual storage controllers 160a-n may be Host Bus Adapters (HBAs) that provide more limited capabilities in accessing physical storage drives provided via storage sleds 110a-n and/or via SAS expander 130.

As illustrated, chassis 100 may also include one or more storage sleds 110a-n that are coupled to backplane 125 and installed within one or more bays of chassis 100 in a similar manner to compute sleds 105a-n. Each of individual storage sleds 110a-n may include different numbers and types of storage devices 165a-n. For instance, storage sleds 110a-n may include SAS magnetic disk drives, Serial Advanced Technology Attachment (SATA) magnetic disk drives, solid-state drives (SSDs), and other types of storage drives in various combinations. Storage sleds 110a-n may be utilized in various storage configurations by compute sleds 105a-n that are coupled to chassis 100. As illustrated, each storage sled 110a-n includes RAC 170a-n, which may also be BMCs, to provide capabilities for remote monitoring and management. Again, as a non-limiting example of a RAC, the integrated Dell RAC (iDRAC) from Dell® is embedded within Dell PowerEdge™ devices and provides functionality that helps information technology (IT) administrators deploy, update, monitor, and maintain devices remotely.

In some implementations, processing tasks may be allocated for processing to a specific processing unit, such as to DPUs 115a-n, which are supplementary processors that operate separate from the one or more main CPUs 155a-n of compute sleds 105a-n, or the like. Each of the DPUs 115a-n may include respective programmable processor 175a-n that can be configured for offloading functions from CPUs 155a-n. In some instances, DPUs 115a-n may be programmed to offload functions that support the operation of devices or systems that are coupled in chassis 100 thus sparing CPUs 155a-n from a significant number of interrupts required to support these devices and gaining efficiency through the use of specialized implementations of these offloaded functions that can be achieved using the programmable logic of the DPUs 155a-n. In some embodiments, DPU processors 175a-n may each include a plurality of programmable processing cores and/or hardware accelerators, that may be used to implement functions used to support devices in chassis. In some embodiments, the processing cores of DPU processor 175a-n may include ARM (advanced RISC (reduced instruction set computing) machine) processing cores. In other embodiments, the cores of DPU processor 175a-n may include MIPS (microprocessor without interlocked pipeline stages) cores, RISC-V cores, or CISC (complex instruction set computing) (i.e., ×86) cores. Each core of the DPU processor 175a-n may be programmed to perform separate functions that support operation of chassis devices. In some embodiments, DPUs 115a-n may be implemented through integrated circuits mounted on a printed circuit board (e.g., a replaceable card) that is coupled to backplane 125, or the like. In various embodiments, DPUs 115a-n may manage high-bandwidth connections with networking devices in implementing functions of a network switch, compression and codec functions, virtualization operations or cryptographic functions. As shown, each of DPUs 115a-n may also include a respective BMC 180a-n to provide capabilities for (remote) monitoring and management of various aspects of the DPU. In support of these operations, BMCs 180a-n may utilize both in-band, sideband and/or out of band communications with certain managed components of respective DPU, such as, for example, processor(s) 175a-n. BMCs 180a-n may each include non-volatile memory having program instructions stored thereon that are usable by CPUs 175a-n to enable (remote) management of the respective DPU.

In addition to the data storage capabilities provided by storage sleds 110a-n, chassis 100 may provide access to other storage resources that may be installed components of chassis 100 and/or may be installed elsewhere within a rack housing the chassis 100, such as within a storage blade. In certain scenarios, such storage resources 185 may be accessed via SAS expander 130 coupled to the backplane 125. SAS expander 130 may support connections to a number of Just a Bunch Of Disks (JBOD) storage drives 185 that may be configured and managed individually and without implementing data redundancy across drives 185. Additional storage resources 185 may also be at various other locations within a datacenter in which chassis 100 is installed. Such additional storage resources 185 may also be remotely located.

As illustrated, chassis 100 of FIG. 1 may include a network controller 140 that provides network access to the sleds 105a-n, 110a-n, DPUs 115a-n, etc. installed within the chassis. Network controller 140 may include various switches, adapters, controllers and couplings used to connect chassis 100 to a network, either directly or via additional networking components and connections provided via a rack in which chassis 100 is installed.

Chassis 100 may similarly include PSU 145 that provides the components of the chassis with various levels of DC power from an AC power source or from power delivered via a power system provided by a rack within which chassis 100 may be installed. In certain embodiments, PSU 145 may be implemented within a sled that may provide chassis 100 with redundant, hot-swappable PSUs.

Chassis 100 may also include various I/O controllers 135 that may support various I/O ports, such as USB ports that may be used to support keyboard and mouse inputs and/or video display capabilities. Such I/O controllers 135 may be utilized by chassis management controller (CMC) 190, which may variously be referred to herein as a "chassis integrated remote access controller," or the like, to support various KVM (Keyboard, Video and Mouse) 190a capabilities that provide administrators with the ability to interface with the chassis 100. To wit, CMC 125 may provide a system management console via KVM 190a to enable such capabilities that provide administrators with the ability to interface with the chassis 100. One example of such a system management console is the Dell® OpenManage Enterprise (OME) systems management console. In some embodiments, a system management console may be deployed on a secure virtual machine (VM), such as a VMWARE Workstation appliance. CMC 190 may also include storage module 190c that provides capabilities for managing and configuring certain aspects of the storage devices of chassis 100, such as the storage devices provided within storage sleds 110a-n and within JBOD 185, as well as other aspects of chassis devices such as compute sleds 105a-n, DPUs 115a-n, etc., and other components of chassis 100. In addition to providing support for KVM 190a capabilities for administering chassis 100, CMC 190 may support various additional functions for sharing the infrastructure resources of chassis 100. In some scenarios, CMC 190 may implement tools for managing power 145, network bandwidth 140, and airflow cooling 120 available via chassis 100. For example, airflow cooling 120 may be provided by a rack in which chassis 100 may be installed and managed by cooling module 190b of CMC 190.

FIG. 2 shows an example of an IHS 200 configured to implement systems and methods described herein for centralized management of addon BMCs through an integrated server remote access controller, according to some embodiments. It should be appreciated that although the embodiments described herein may describe an IHS that is a compute sled, storage sled, DPU, or similar computing component that may be deployed within the bays of a chassis (100), other embodiments may be utilized with other types of IHSs that may also support centralized management of addon BMCs through an integrated server remote access controller. In the example of FIG. 2, IHS 200 may be a computing component, such as compute sled 105a-n or other type of server, such as an 1RU server installed within a 2RU chassis, that is configured to share infrastructure resources provided by chassis 100. In other examples, storage sleds 110a-n, DPUs 115a-n, and/or the like, may each include a number of the components described as a part of IHS 200.

Thus, IHS 200 of FIG. 2 may be a compute sled, storage sled, DPU, or similar computing component, such as compute sleds 105a-n, storage sleds 110a-n and/or DPUs 115a-n of FIG. 1, that may be installed within a chassis (100), that may in turn be installed within a rack. Installed in this manner, IHS 200 may utilize shared power, network and cooling resources provided by the chassis and/or rack. Embodiments of IHS 200 may include a wide variety of different hardware configurations.

However, IHS 200 may generally utilize one or more processors 205. In some embodiments, processors 205 may include a main processor and a co-processor, each of which may include a plurality of processing cores that, in certain cases, may each be used to run an instance of a server process. In some implementations, one or all of processor(s) 205 may be GPUs in scenarios where IHS 200 has been configured to support operations such as multimedia services and graphics applications.

As illustrated, processor(s) 205 includes integrated memory controller 205a that may be implemented directly within the circuitry of processor 205. Alternatively, memory controller 205a may be a separate integrated circuit that is located on the same die as processor 205. Memory controller 205a may be configured to manage the transfer of data to and from system memory 210 of processor(s) 205 via high-speed memory interface 205b. System memory 210 is coupled to processor(s) 205 via memory bus 205b that provides processor(s) 205 with high-speed memory used in the execution of computer program instructions by processor(s) 205. Accordingly, system memory 210 may include memory components, such as static RAM (SRAM), dynamic RAM (DRAM), NAND Flash memory, suitable for supporting high-speed memory operations by processor(s) 205. In certain embodiments, system memory 210 may combine both persistent, non-volatile memory and volatile memory.

In certain embodiments, system memory 210 may include multiple removable memory modules. System memory 210 of the illustrated embodiment includes removable memory modules 210a-n. Each of removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

In certain embodiments, IHS 200 may operate using a BIOS (Basic Input/Output System) that may be stored in a non-volatile memory accessible by the processor(s) 205. The BIOS may provide an abstraction layer by which the operating system (OS) of IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200, and removable components installed within various expansion slots supported by IHS 200. The BIOS instructions may also load an OS for use by the IHS 200. In certain embodiments, IHS 200 may utilize Unified Extensible Firmware Interface (UEFI) in addition to or instead of a BIOS. In certain embodiments, the operations provided by a BIOS may be implemented, in full or in part, by RAC 215. Moreover, BIOS may be configured to identify hardware components that are detected as being currently installed in IHS 200.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described in greater detail below, IHS 200 may include a RAC 215, a BMC, or the like, that supports remote management of IHS 200 and of various internal components of IHS 200, as well as access to other components of a chassis (100) in which IHS 200 is deployed, such as storage sleds, DPUs, and the like. As a non-limiting example of a RAC, the integrated Dell RAC (iDRAC) from Dell® may be embedded within Dell PowerEdge™ devices and provides functionality that helps information technology (IT) administrators deploy, update, monitor, and maintain servers remotely. Such a RAC may variously be referred to herein as a "integrated server remote access controller," "iRAC" or the like. In certain embodiments, RAC 215 may operate from a different power plane from the processors 205 and other components of IHS 200, thus allowing RAC 215 to operate, and management tasks to proceed, while the processing cores of IHS 200 are powered off. In some cases, various operations provided by the BIOS, including launching the OS of the IHS 200, may be implemented by RAC 215. RAC 215 may perform various functions to verify the integrity of the IHS 200 and its hardware components prior to initialization of the OS of IHS 200 (i.e., in a bare-metal state).

IHS 200 may utilize a chipset that may be implemented by integrated circuits that are connected to each processor 205. All or portions of the chipset may be implemented directly within the integrated circuitry of processor(s) 205. The chipset may provide processor(s) 205 with access to a variety of resources accessible via one or more in-band buses 220. Various embodiments may utilize any number of buses to provide the illustrated pathways served by in-band bus 220. In certain embodiments, in-band bus 220 may include a PCIe (PCI Express) switch fabric that is accessed via a PCIe root complex.

As illustrated, IHS 200 may include one or more FPGA (Field-Programmable Gate Array) cards 225. Each FPGA card 225 may include various processing and memory resources, in addition to an FPGA logic unit that may include circuits that can be reconfigured after deployment of IHS 200 through programming operations supported by FPGA card 225. Through such reprogramming of such logic units, each individual FGPA card 225 may be optimized to perform specific processing tasks, such as specific signal processing, security, data mining, and artificial intelligence functions, and/or to support specific hardware coupled to IHS 200. In some implementations, a single FPGA card 225 may include multiple FPGA logic units, each of which may be separately programmed to implement different computing operations, such as in computing different operations that are being offloaded from processor(s) 205. FPGA card 225 may also include a management controller 225a that may support interoperation with RAC 215 via a sideband device management bus 230a.

Processor(s) 205 may also be coupled to network controller 235 via in-band bus 220, such as provided by a Network Interface Controller (NIC) that allows the IHS 200 to communicate via an external network, such as the Internet or a LAN. In some embodiments, network controller 235 may be a replaceable expansion card or adapter that is coupled to a motherboard connector of IHS 200. Alternatively, network controller 235 may be an integrated component of IHS 200. Also, in accordance with embodiments of the present systems and methods, a "Smart NIC DPU" may, as noted, be deployed in the same chassis as IHS 100, or in another chassis, rack, or the like. Such a Smart NIC, is a programmable accelerator that makes data center networking, security and storage efficient and flexible and may offload from server CPU(s) (205) tasks related to networking, data movement, data storage, communication, etc.

IHS 200 may include one or more storage controllers 240 that may be utilized to access storage devices 245a-n that are accessible via the chassis in which IHS 200 is installed. Storage controller 240 may provide support for RAID (Redundant Array of Independent Disks) configurations of logical and physical storage devices 245a-n. In some embodiments, storage controller 240 may be an HBA (Host Bus Adapter) that provides more limited capabilities in accessing physical storage devices 245a-n. In some embodiments, storage devices 245a-n may be replaceable, hot-swappable storage devices that are installed within bays provided by the chassis in which IHS 200 is installed. In embodiments where storage devices 245a-n are hot-swappable devices that are received by bays of chassis, the storage devices 245a-n may be coupled to IHS 200 via couplings between the bays of the chassis and a midplane of IHS 200. In some embodiments, storage devices 245a-n may also be accessed by other IHSs that are also installed within the same chassis as IHS 200. Storage devices 245a-n may include SAS (Serial Attached SCSI) magnetic disk drives, SATA (Serial Advanced Technology Attachment) magnetic disk drives, solid-state drives (SSDs) and other types of storage devices in various combinations.

A variety of additional components may be coupled to processor(s) 205 via in-band bus 220. For instance, processor(s) 205 may also be coupled to power management unit 250 that may interface with power system unit 145 of chassis 100 in which IHS 200 is installed. In certain implementations, graphics processor 255 may be comprised within one or more video or graphics cards, or an embedded controller, installed as components of the IHS 200. For example, graphics processor 255 may be an integrated component of RAC 215 and may be utilized to support the display of diagnostic and administrative interfaces related to IHS 200 via display devices that are coupled, either directly or remotely, to RAC 215. IHS 200 may also include one or more I/O ports 260, such as PCIe ports, that may be used to couple the IHS 200 directly to other IHSs, storage resources and/or other peripheral components.

Returning to RAC 215, The management operations of RAC 215 may utilize information collected by various managed sensors 265 located within the IHS. For instance, temperature data collected by sensors 280 may be utilized by RAC 215 in support of closed-loop airflow cooling of the IHS 200. RAC 215 may include a service processor 215a, or specialized microcontroller, that operates management software that supports remote monitoring and administration of IHS 200. RAC 215 may be installed on the motherboard of IHS 200 or may be coupled to IHS 200 via an expansion slot provided by the motherboard. In support of remote monitoring, network adapter 215c may support connections with RAC 215 using wired and/or wireless network connections via a variety of network technologies. In some implementations, RAC 215 may support monitoring and administration of various managed devices 225, 235, 240, 265 of an IHS via a sideband bus interface. For instance, messages utilized in device management may be transmitted using I2C sideband bus connections 230a-d that may be individually established with each of the respective managed devices 225, 235, 240, 265 through the operation of an I2C multiplexer 215d of RAC 215. Certain of the managed devices of IHS 200, such as non-standard hardware 225, network controller 235, and storage controller 240, are coupled to the IHS processor(s) 205 via an in-line bus 220, such as a PCIe root complex, that is separate from the I2C sideband bus connections 230a-d used for device management.

Service processor 215a of RAC 215 may rely on an I2C co-processor 215b to implement sideband I2C communications between RAC 215 and managed components 225, 235, 240, 265 of the IHS. I2C co-processor 215b may be a specialized co-processor or microcontroller that is configured to interface via a sideband I2C bus interface with the managed hardware components 225, 235, 240, 265 of IHS 200. In some embodiments, I2C co-processor 215b may be an integrated component of the service processor 215a, such as a peripheral system-on-chip (SoC) feature that may be provided by service processor 215a. I2C co-processor 215b may interface with individual managed devices 225, 235, 240, 265 via individual sideband I2C buses 230a-d selected through the operation of I2C multiplexer 215d. Via switching operations by I2C multiplexer 215d, sideband bus connection 230a-d may be established by a direct coupling between the I2C co-processor 215b and individual managed devices 225, 235, 240, 265. Each I2C bus 230a-d is illustrated as single line in FIG. 2. However, each I2C bus 230a-d may be comprised of a clock line and data line that couple RAC 215 to 120 endpoints 225a, 235a, 240a, 265a, which may be referred to as modular field replaceable units (FRUs). In providing sideband management capabilities, I2C co-processor 215b may each interoperate with corresponding endpoint I2C controllers 225a, 235a, 240a, 265a that implement the I2C communications of the respective managed devices 225, 235, 240, 265. Endpoint I2C controllers 225a, 235a, 240a, 265a may be implemented as dedicated microcontrollers for communicating sideband I2C messages with RAC 215, or endpoint I2C controllers 225a, 235a, 240a, 265a may be integrated SoC functions of a processor of the respective managed device endpoints 225, 235, 240, 265.

In some embodiments, the cryptographic capabilities of RAC 215 may also include safeguards for encrypting any private keys that are generated by RAC 215 and further anchoring them to components within the root of trust of IHS 200. For instance, a RAC 215 may include capabilities for accessing hardware root key (HRK) capabilities of IHS 200, such as for encrypting the private key of the keypair generated by RAC 215. Such capabilities may be used in accordance with embodiments of the present systems and methods.

In various embodiments, IHS 200 does not include each of the components shown in FIG. 2. In various embodiments, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the operations performed by the illustrated components may instead be provided by components integrated into the one or more processor(s) 205 as an SoC. In other examples, such as may take the form of storage sleds (110a-n), or DPUs for which embodiments of the present systems and methods provide centralized management, such IHSs may have a BMC, or the like, which may be referred to herein as a "addon" BMCs, or the like.

As noted, system management clients (i.e., client users managing one or more servers in a (modular) IHS (server) chassis, or the like) may use a protocol providing a Representational State Transfer constrained (RESTful) interface (e.g., a Redfish API). This Redfish API, or the like, may be used to communicate with a Redfish server, or the like, on an integrated server chassis remote access controller (CMC 125), IHS integrated RAC (215), or the like, which herein may be generally referred to as a "integrated server remote access controller," or the like. In turn, this integrated server remote access controller may communicate with other Redfish servers, or the like, running on Baseboard Management Controllers (BMCs) of various devices, as discussed above. However, managing of all such BMCs through respective channels can be a challenge, particularly with the growing number of devices having inbuilt BMCs. Managing credentials for each of the BMC hosted device can also be a significant task in hand This typically results in higher costs of management infra, in terms of dedicated network connections and switching terminals. However, under embodiments of the present systems and methods an integrated server remote access controller may seamlessly manage credentials when communicating with other BMCs.

Figure 3:
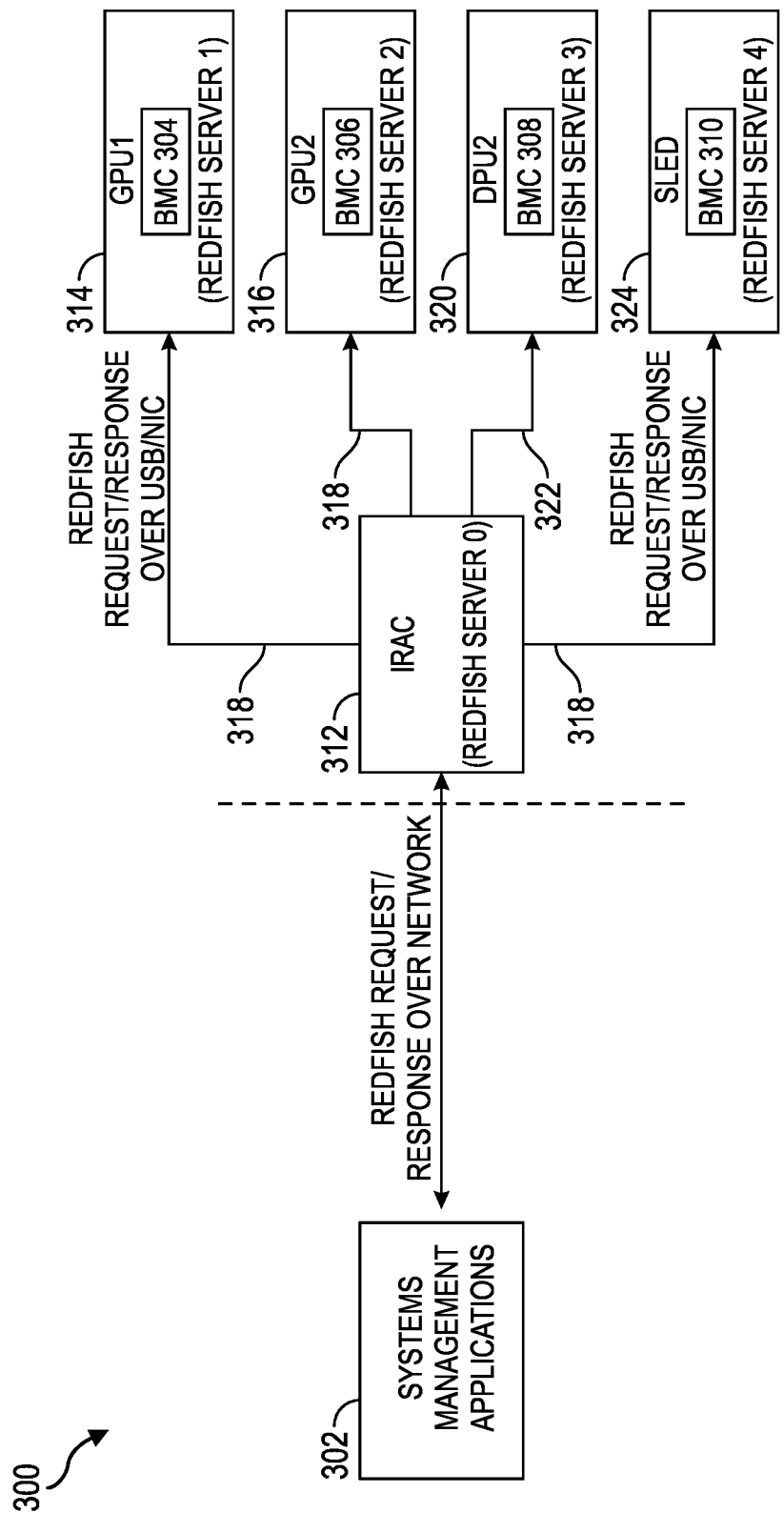
FIG. 3 is a block diagram of example communication between a systems management application and Baseboard Management Controllers (BMCs) of various devices, via an integrated server remote access controller, according to some embodiments.

FIG. 3 is a block diagram of example communication 300 between systems management application 302 and BMCs 304 through 310 of various devices, via integrated server remote access controller 312, according to some embodiments. For example, as shown in FIG. 3, by way of example, BMCs 304 and 306 on GPU cards 314 and 316 may connect to integrated server remote access controller 312 over Universal Serial Bus-Network Interface Card (USB-NIC) interface 318. BMC 308 on Data Processing unit (DPU) card 320 may connect over Reduced Media-Independent Interface (RMII) Based Transport (RBT) 322 to integrated server remote access controller 312. BMC 310 on (compute or storage) sled 324 may also connect to integrated server remote access controller 312 over (USB-NIC).

Embodiments of the present systems and methods provide a token embedding mechanism to bridge and manage resource requests between authorization servers. To such ends, embodiments of the present systems and methods define a model and mechanism for managing authorized communication between an integrated server remote access controller and secondary BMCs hosted on devices such as a DPU, GPU, etc. As noted, for purposes of description, such GPU cards, DPU cards, smart NICs, or the like, will be referred to herein, individually, as a "DPU." Leveraging trust between an integrated server remote access controller and a DPU and the trust between the DPU and the DPU's BMC, embodiments of the present systems and methods enable direct communication between the integrated server remote access controller and the DPU BMC on a one-to-one basis. Embodiments of the present systems and methods generate secure (and multilayered) tokens which may be used by the integrated server remote access controller for tunneling client requests to secondary (DPU, GPU, etc.) BMCs without managing secondary (DPU) BMC credentials. To such ends, embodiments of the present systems and methods provide secure token generation for integrated server remote access controller-to-secondary BMC communication through a DPU host (UEFI/OS) proxy, or the like, as detailed below.

Figure 4:
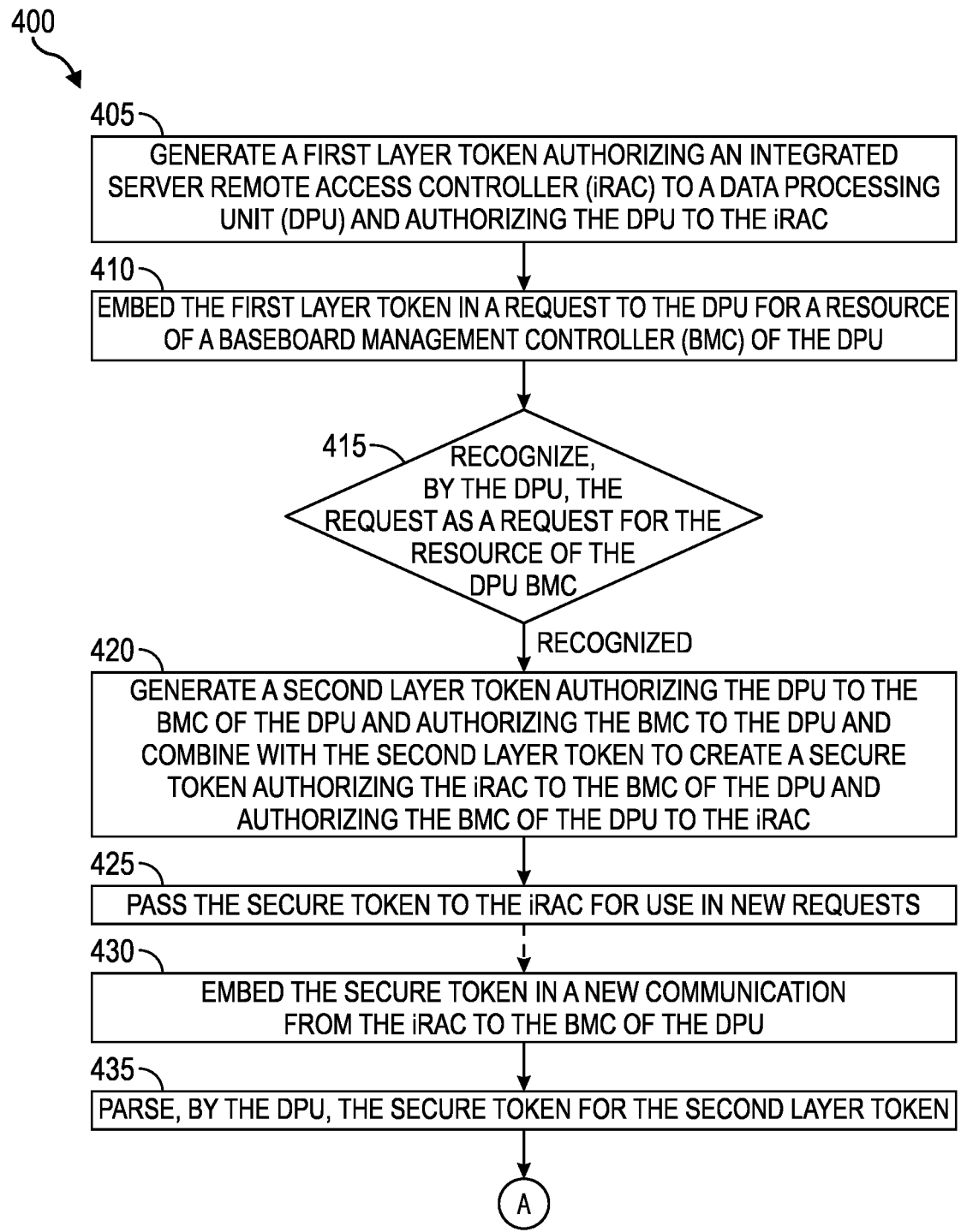
FIG. 4 is a flowchart of an example process for centralized management of addon BMCs through an integrated server remote access controller, according to some embodiments.
Figure 4:
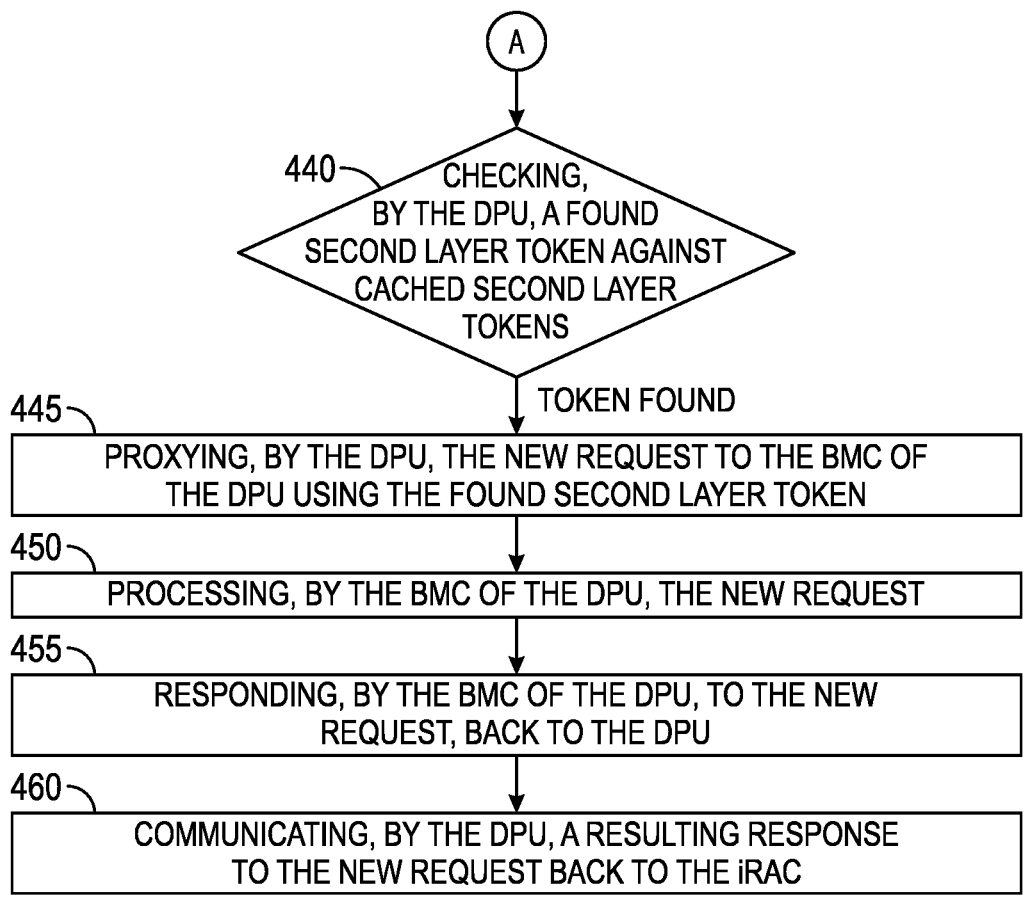
Figure 5:
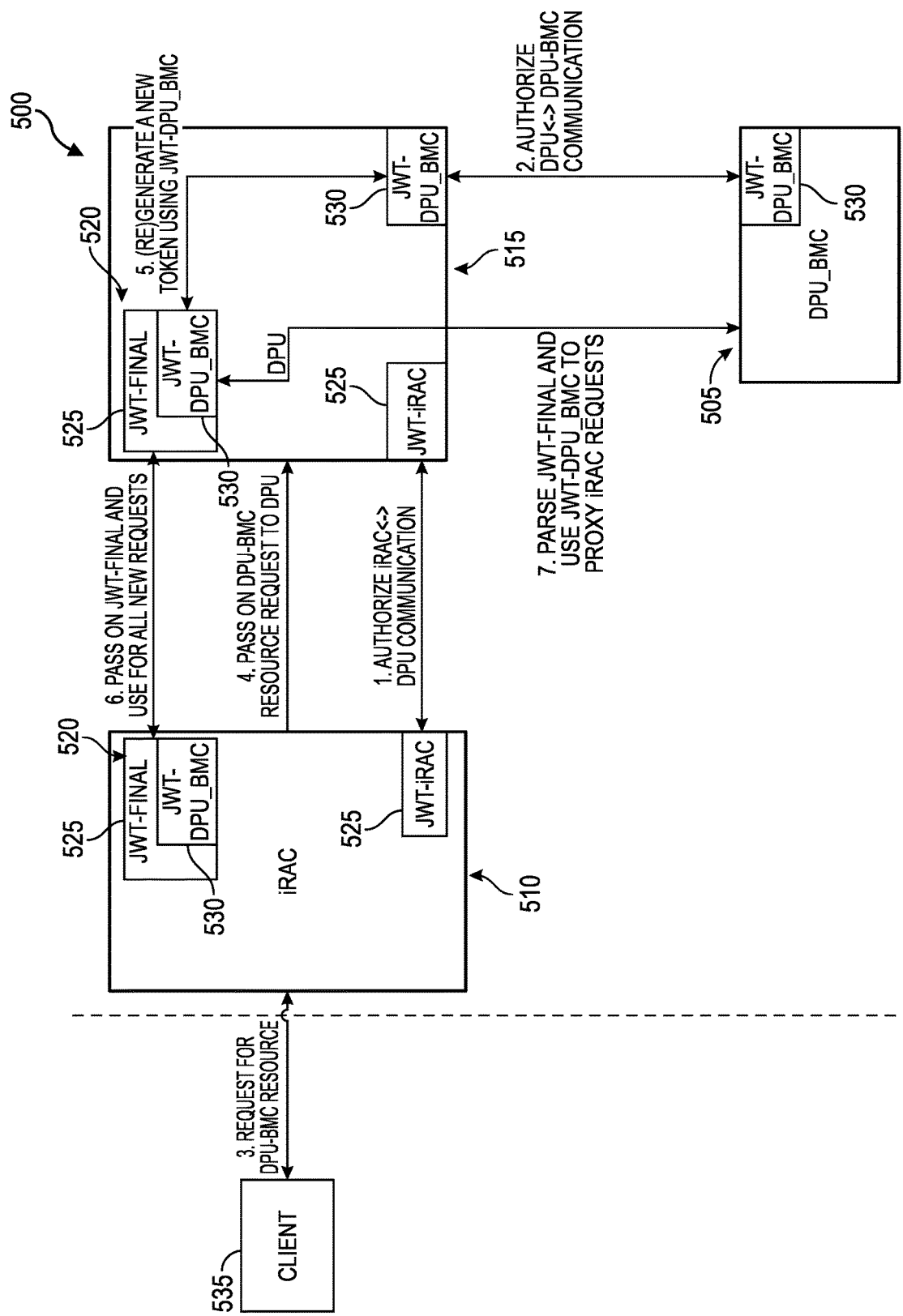
FIG. 5 is a block diagram of an example implementation of the process of FIG. 4 for centralized management of addon BMCs through an integrated server remote access controller, according to some embodiments.

FIG. 4 is a flowchart of example process 400 for centralized management of addon BMCs through an integrated server remote access controller (510), which may be any of CMC 190, RAC 150a-n, RAC 215, iRAC 312, etc., according to some embodiments, and FIG. 5 is a block diagram of example implementation 500 of process 400 of FIG. 4 for centralized management of addon BMC 505 through integrated server remote access controller 510, according to some embodiments. In the embodiment(s) generally illustrated in FIGS. 4 and 5, communications between integrated server remote access controller 510 and DPU BMC 505 is through secondary DPU host 515. With reference to both FIGS. 4 and 5, process 400 is described, wherein, centralized management of DPU BMC 505 through integrated server remote access controller 510 (e.g., CMC 190, RAC 150a-n, RAC 215 or iRAC 312) embeds secure token 520 in a communication from integrated server remote access controller 510 to BMC 505 of DPU 515 (115a-n) deployed in a server chassis (100). Secure token 520 authorizes integrated server remote access controller 510 to BMC 505 of DPU 515 and authorizes BMC 505 of DPU 515 to the integrated server remote access controller. For example, in the embodiment(s) generally illustrated in FIGS. 4 and 5, secure token 520 may be multilayered and may, for example include first layer token 525 authorizing integrated server remote access controller 510 to DPU 515 and authorizing DPU 515 to integrated server remote access controller 510, and second layer token 530 authorizing DPU 515 to BMC 505 and authorizing BMC 505 to DPU 515. With attention directed to FIG. 5, the first layer token is, by way of example, JWT (Json Web Token)-iRAC 525, while second layer token is JWT-DPU_BMC 530. Authorization provided in a token under embodiments of the present systems and methods may take the form of a "claim" in a JavaScript Object Notation (JSON) web token that is signed either using a private secret or a public/private key. However, other types of tokens may be used in accordance with embodiments of the present systems and methods, for example Oauth2 and X-Auth tokens used by Redfish, and/or the like.

Returning now to FIG. 4, as preliminary matter, communication between integrated server remote access controller 510 and DPU 515 may be generally authorized and communication between DPU 515 and BMC 505 of DPU 515 may be generally authorized (i.e., "pre-authorized," in a server chassis (100) deployment, as shown in FIG. 1, or the like). That is, webserver clients running on DPU 515 (OS, UEFI, etc.) can communicate with integrated server remote access controller 510 with integrated server remote access controller credentials. This establishes the authenticity of DPU 515 and authorizes generation of a first layer token, such as JWT-iRAC 525. All communications between integrated server remote access controller 510 and DPU host 515 may, in accordance with embodiments of the present systems and methods, use this JWT-iRAC. Thusly, at 405, integrated server remote access controller 510, or the like, may generate first layer token 525. Also, in this regard, with DPU 515 owning a BMC of its own, BMC 505, webserver clients (OS, UEFI, etc.) on DPU 515 may communicate with DPU BMC 505 and create a second layer token, such as JWT-DPU_BMC 530 for (future) communications.

Upon client (535) requests to integrated server remote access controller 510 about resources managed by DPU BMC 505, the integrated server remote access controller may propagate this inquiry, as a request to DPU client 515 with JWT-iRAC 525. Thus, at 410, integrated server remote access controller 510, or the like, may embed first layer token 525 in a(n) (initial) request to DPU 515 for a resource of DPU BMC 505. DPU 515 may also be configured to, at 415, recognize the request as a request for the resource of BMC 505 of DPU 515. In response to DPU client 515 determining the request is to be served from DPU BMC 505, a new token, a JWT or the like, is generated at 420, which contains JWT DPU_BMC, or the like, as second layer token 530 of payload for token generation of secure token 520 (e.g., JWT (Final)). Also, at 420, a copy of second layer token 530 (e.g., JWT DPU_BMC) may be cached, upon its creation, by DPU 515. DPU 515 may then, at 425 pass secure token 520 to integrated server remote access controller 510 for use in new requests. Such as (newly created) JWT (Final) (i.e., secure token 520) should, in accordance with embodiments of the present systems and methods, be used for all (future) communications between integrated server remote access controller 510 and DPU client 515.

For example, at 430 integrated server remote access controller 510 embeds secure token 520 (e.g., JWT (Final) in a new request to DPU 515 for a resource (the same resource requested earlier, or another resource) of BMC 505 of DPU 515. This (newly created) secure token 520 (e.g., JWT (Final)) token is parsed by DPU client 515, for second layer token 530 (JWT DPU_BMC), at 435. If DPU 515 finds an embedded token (e.g., a JWT-DPU_BMC), this found token is checked against cached tokens, such as may be cached by DPU 515 upon creation of (each) second layer token 530 (JWT DPU_BMC) at 420. Thus, at 440, DPU 515 checks a found second layer token against cached second layer tokens that authorize DPU 515 to BMC 505 and authorize BMC 505 to DPU 515. If a match is found (against JWT DPU_BMC), the request is further proxied to DPU BMC 505, using embedded second layer token 530 (e.g., JWT (DPU_BMC)). That is, in response to a match of the found second layer token to a cached second layer token, at 440, the new request is proxied to BMC 505 of DPU 515 using the found second layer token, at 445. At 450, BMC 505 of DPU 515 processes the new request and responds to the new request, at 455 back to DPU 515, for DPU 515 to communicate a resulting response to the new request back to integrated server remote access controller 510, using secure token 520 (e.g., JWT (Final), which includes first layer token (JWT-iRAC) 525) at 460.

Similarly, any requests made from DPU-BMC 505 to integrated server remote access controller 510 may also use a similar multi-layered secure token (e.g., JWT-Final) embedding mechanism. For example, DPU BMC 505 embeds secure token 520 (e.g., JWT (Final) in a request to integrated server remote access controller 510 for a resource of integrated server remote access controller 510. This secure token 520 (e.g., JWT (Final)) token is parsed by DPU client 515, for first layer token 525 (JWT-iRAC). If DPU 515 finds an embedded token (e.g., a JWT-iRAC), this found token is checked against cached tokens that authorize DPU 515 to integrated server remote access controller 510 and authorize 430 integrated server remote access controller 510 to DPU 515. If a match is found (against JWT-iRAC), the request is further proxied to integrated server remote access controller 510 DPU, using embedded first layer token 525 (e.g., JWT-iRAC). Integrated server remote access controller 510 processes the request and responds to the request back to DPU 515, for DPU 515 to communicate a resulting response to DPU BMC 505, using secure token 520 (e.g., JWT (Final), which includes second layer token (JWT (DPU_BMC)) 530.

Figure 6:
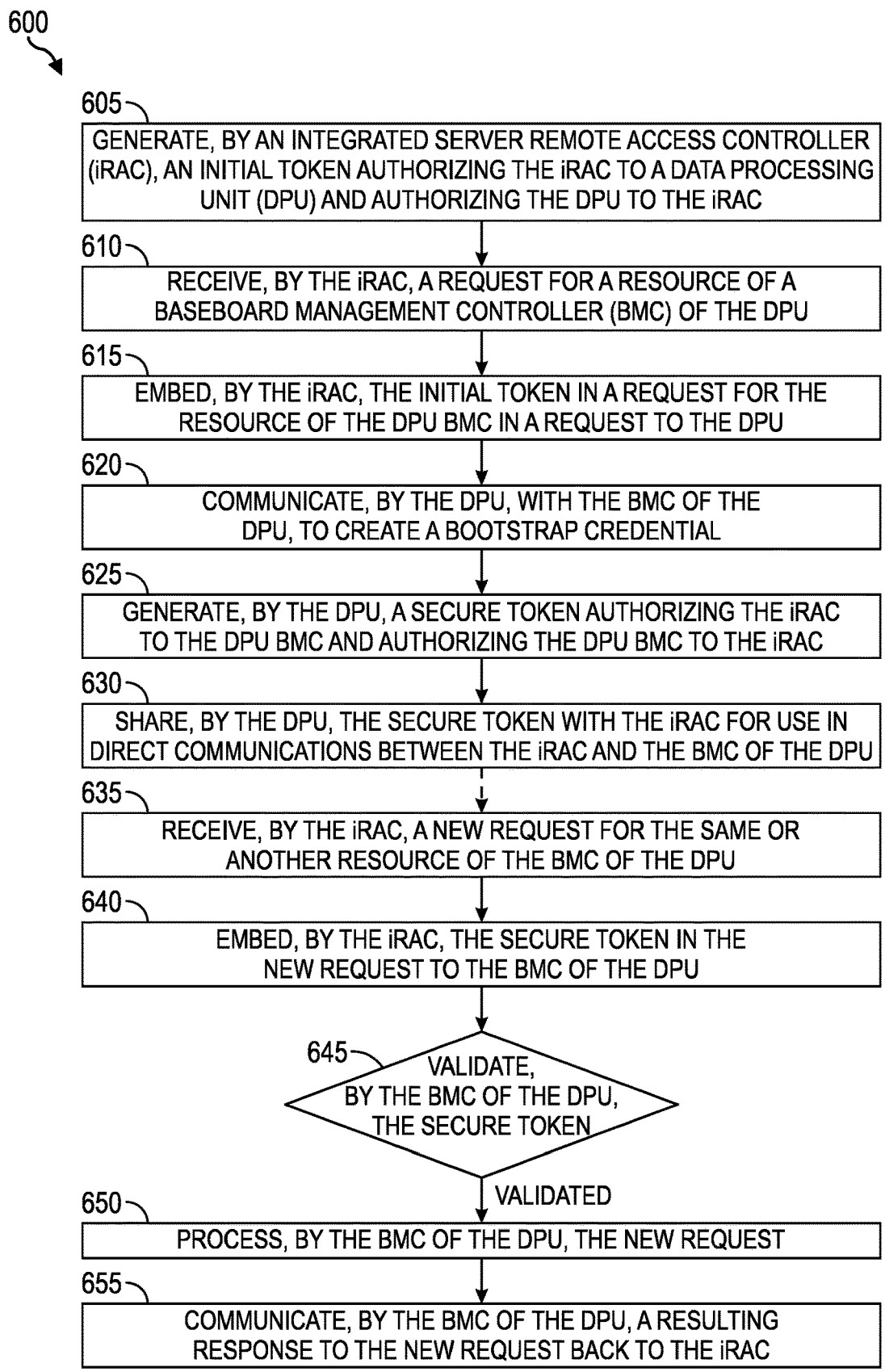
FIG. 6 is a flowchart of another example process for centralized management of addon BMCs through an integrated server remote access controller, according to some other embodiments.
Figure 7:
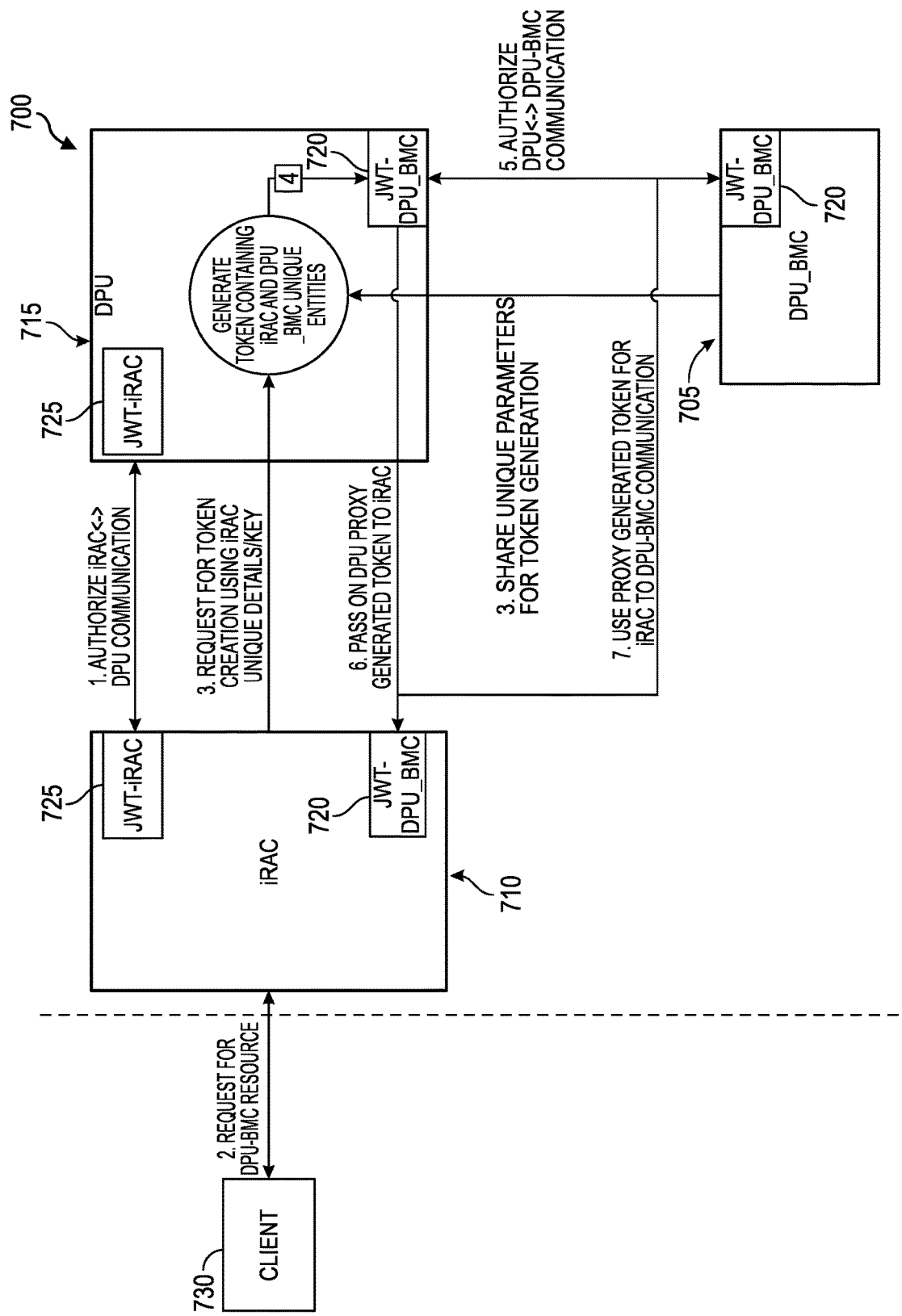
FIG. 7 is a block diagram of an example implementation of the process of FIG. 6 for centralized management of addon BMCs through an integrated server remote access controller, according to some embodiments.

FIG. 6 is a flowchart of example process 600 for centralized management of addon BMCs through an integrated server remote access controller (710), which may be any of CMC 190, RAC 150a-n, RAC 215 or iRAC 312, etc., according to some embodiments, and FIG. 7 is a block diagram of example implementation 700 of process 600 of FIG. 6 for centralized management of addon BMC 705 through integrated server remote access controller 710, according to some embodiments. In the embodiment(s) generally illustrated in FIGS. 6 and 7, communications between integrated server remote access controller 710 and BMC 705 of DPU 715 is direct, in the manner described below. With reference to both FIGS. 6 and 7, process 600 is described, wherein, centralized management of DPU BMC 705 through integrated server remote access controller 710 ((e.g., CMC 190, RAC 150a-n, RAC 215 or iRAC 312) embeds secure token 720 in a communication from integrated server remote access controller 710 to BMC 705 of DPU 715 (115a-n) deployed in a server chassis (100). Secure token 720 authorizes integrated server remote access controller 710 to BMC 705 of DPU 715 and authorizes BMC 705 of DPU 715 to the integrated server remote access controller.

For example, in the embodiment(s) generally illustrated in FIGS. 6 and 7, webserver clients running on DPU 715 (e.g., OS, UEFI, etc.) can communicate with integrated server remote access controller 710 using integrated server remote access controller credentials. This establishes authenticity of DPU 715 and enables generation of an initial (or first) token 725 (e.g., JWT-iRAC), at 605, to be used for all future authorized communications between integrated server remote access controller 710 and DPU host 715. That is, integrated server remote access controller 510 may I be configured to generate, at 605, an initial token authorizing the integrated server remote access controller 710 to DPU 715 and authorizing DPU 715 to the integrated server remote access controller 710. At 610, integrated server remote access controller 710 may receive a request for a resource of BMC 505 of DPU 515, such as from client 730, and at 615, integrated server remote access controller 710 may request the resource of DPU BMC 705 from DPU 715. Initial (or first) token 725 may be embedded in this request, by integrated server remote access controller 710 at 615, thereby authorizing integrated server remote access controller 710 to DPU 715 and authorizing DPU 715 to integrated server remote access controller 710.

Upon this request from integrated server remote access controller 710, DPU client 715 may, at 620 communicate with DPU BMC 705, through a host interface of DPU 715, and create a bootstrap credential. DPU 715 shall the authorize DPU BMC 705 and, at 625 create secure token 720 (e.g., JWT-DPU_BMC), which may include a source of origin and a secret key map obtained (by DPU 715) from integrated server remote access controller 710 and DPU BMC 705. DPU created secure token 720 (e.g., JWT-DPU_BMC) is shared with integrated server remote access controller 710 at 630, for integrated server remote access controller 710 to use for (all) direct communications with DPU BMC 705.

Thereafter, upon integrated server remote access controller 710 receiving a (further) request for a DPU BMC resource (e.g., a request for the same or another DPU BMC resource) at 635, integrated server remote access controller 710 shall present (e.g., embed) secure (DPU BMC signed) token 720, at 640, in this request to DPU BMC 705. Secure token 720, is, in turn, validated in DPU BMC 705, at 645 for authenticity by checking for source of origin, privilege and other agreed unique integrated server remote access controller parameters. If the secure token is validated at 645, the (new) request is at 650, processed by BMC 705 of DPU 715 and DPU BMC 705 communicates a resulting response to the (new) request back to integrated server remote access controller 710 at 655

In accordance with the foregoing, any malicious actor request to DPU BMC 505 or 705 for configuration updates, remote actions, firmware updates, deployments, etc. will be blocked on criteria of source secret information not being matched.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations. It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method for centralized management of a data processing unit (DPU) baseboard management controller (BMC) through an integrated server remote access controller (RAC) comprising:
   embedding a secure token in a communication from an integrated server RAC to a BMC of a DPU deployed in a server chassis, the secure token authorizing the integrated server RAC to the BMC of the DPU and authorizing the BMC of the DPU the integrated server RAC;
   wherein the secure token comprises:
      a first layer token authorizing the integrated server RAC to the DPU and authorizing the DPU to the integrated server RAC; and
      a second layer token authorizing the DPU to the BMC and authorizing the BMC to the DPU; and
      wherein communication between the integrated server RAC and the DPU is authorized, communication between the DPU and the BMC is authorized, and generating the secure token, comprising:
   generating, by the integrated server RAC, the first layer token;
   receiving, by the integrated server RAC, a request for a resource of the BMC;
   requesting, by the integrated server RAC, the resource of the BMC from the DPU in a request and embedding the first layer token in the request;
   recognizing, by the DPU, the request as a request for the resource of the BMC;
   generating, by the DPU, the second layer token and the secure token; and
   passing, by the DPU, the secure token to the integrated server RAC for use in new requests.

2. The method of claim 1 further comprising:
   receiving, by the integrated server RAC, a new request for a resource of the BMC;
   requesting, by the integrated server RAC, the new resource of the BMC from the DPU in a request and embedding the secure token in the request;
   parsing, by the DPU, the secure token for the second layer token;
   checking, by the DPU, a found second layer token against cached second layer tokens authorizing the DPU to the BMC and authorizing the BMC to the DPU;
   proxying, by the DPU, in response to a match of the found second layer token to a cached second layer token, the new request to the BMC using the found second layer token; processing, by the BMC, the new request; responding, by the BMC, to the new request, back to the DPU;
   and communicating, by the DPU, a resulting response to the new request back to the integrated server RAC.

3. The method of claim 1, wherein communication between the integrated server RAC and the DPU is authorized, communication between the DPU and the BMC is authorized, and the method further comprises generation of the secure token, comprising:
   generating, by the integrated server RAC, an initial token authorizing the integrated server RAC to the DPU and authorizing the DPU to the integrated server RAC;
   receiving, by the integrated server RAC, a request for a resource of the BMC;
   requesting, by the integrated server RAC, the resource of the BMC from the DPU in a request and embedding the initial token in the request;
   communicating, by the DPU, with the BMC, to create a bootstrap credential;

generating, by the DPU, the secure token; and sharing, by the DPU, the secure token with the integrated server RAC for use in direct communications between the integrated server RAC and the BMC.

4. The method of claim 3 further comprising:

receiving, by the integrated server RAC, a new request for a resource of the BMC;

requesting, by the integrated server RAC, the new resource of the BMC from the BMC in a request and embedding the secure token in the request;

validating, by the BMC, the secure token;

processing, by the BMC, the new request, in response to validation of the secure token; and communicating, by the BMC, a resulting response to the new request back to the integrated server RAC.

5. The method of claim 3, wherein the secure token comprises a source of origin and secret key map retrieved from the integrated server RAC and the BMC.

6. An information handling system comprising:

a server chassis;

a data processing unit deployed in the server chassis, the data processing unit comprising a baseboard management controller, the data processing unit configured to:

communicate with the baseboard management controller of the data processing unit to create a bootstrap credential;

generate a secure token; and share the secure token with the server chassis remote access controller for use in direct communications between the server chassis remote access controller and the baseboard management controller of the data processing unit; and a server chassis remote access controller integrated into the server chassis, the server chassis remote access controller configured to:

embed the secure token in a communication from the server chassis remote access controller to the baseboard management controller of the data processing unit, the secure token authorizing the server chassis remote access controller to the baseboard management controller of the data processing unit and authorizing the baseboard management controller of the data processing unit to the server chassis remote access controller;

generate an initial token authorizing the server chassis remote access controller to the data processing unit and authorizing the data processing unit to the server chassis remote access controller; and embed the initial token in request for a resource of the baseboard management controller of the data processing unit;

wherein:

communication between the server chassis remote access controller and the data processing unit is authorized; and communication between the data processing unit and the baseboard management controller of the data processing unit is authorized.

7. The information handling system of claim 6, wherein the secure token comprises:

a first layer token authorizing the server chassis remote access controller to the data processing unit and authorizing the data processing unit to the server chassis remote access controller; and a second layer token authorizing the data processing unit to the baseboard management controller of the data processing unit and authorizing the baseboard management controller of the data processing unit to the data processing unit.

8. The information handling system of claim 7, wherein:

the server chassis remote access controller is further configured to:

generate the first layer token; and embed the first layer token in a request to the data processing unit for a resource of the baseboard management controller of the data processing unit; and the data processing unit is further configured to:

recognize the request as a request for the resource of the baseboard management controller of the data processing unit;

generate the second layer token and the secure token, in response to recognition of the request as a request for the resource of the baseboard management controller of the data processing unit; and pass the secure token to the server chassis remote access controller for use in new requests.

9. The information handling system of claim 8, wherein:

the server chassis remote access controller is further configured to embed the secure token in a new request to the data processing unit for a resource of the baseboard management controller of the data processing unit;

the data processing unit is further configured to:

parse the secure token for the second layer token;

check a found second layer token against cached second layer tokens authorizing the data processing unit to the baseboard management controller of the data processing unit and authorizing the baseboard management controller of the data processing unit to the data processing unit; and proxy, in response to a match of the found second layer token to a cached second layer token, the new request to the baseboard management controller of the data processing unit using the found second layer token; and the baseboard management controller of the data processing unit is further configured to process the new request and respond to the new request, back to the data processing unit, for the data processing unit to communicate a resulting response to the new request back to the server chassis remote access controller.

10. The information handling system of claim 6, wherein:

the server chassis remote access controller is further configured to embed the secure token in a new request for a resource from the baseboard management controller of the data processing unit from the server chassis remote access controller to the baseboard management controller of the data processing unit; and the baseboard management controller of the data processing unit is further configured to:

validate the secure token;

process the new request, in response to validation of the secure token; and communicate a resulting response to the new request back to the server chassis remote access controller.

11. The information handling system of claim 6, wherein the secure token comprises a source of origin and secret key map retrieved from the server chassis remote access controller and the baseboard management controller of the data processing unit.

12. A non-transitory computer readable medium having program instructions stored thereon that, upon execution by an integrated server remote access controller, cause the integrated server remote access controller to:
   embed a secure token in a communication from the integrated server remote access controller to a baseboard management controller of a data processing unit deployed in the server chassis, the secure token authorizing the integrated server remote access controller to the baseboard management controller of the data processing unit and authorizing the baseboard management controller of the data processing unit to the server chassis remote access controller;
   wherein the secure token comprises:
      a first layer token authorizing the integrated server remote access controller to the data processing unit and authorizing the data processing unit to the server chassis remote access controller; and
      a second layer token authorizing the data processing unit to the baseboard management controller of the data processing unit and authorizing the baseboard management controller of the data processing unit to the data processing unit;
   generate the first layer token; and
   embed the first layer token in a request to the data processing unit for a resource of the baseboard management controller of the data processing unit; and
   upon execution by the data processing unit, the program instructions further cause the data processing unit to:
   recognize the request as a request for the resource of the baseboard management controller of the data processing unit;
   generate the second layer token and the secure token, in response to recognition of the request as a request for the resource of the baseboard management controller of the data processing unit; and
   pass the secure token to the integrated server remote access controller for use in new requests;
   wherein:
      communication between the integrated server remote access controller and the data processing unit is authorized; and
      communication between the data processing unit and the baseboard management controller of the data processing unit is authorized.

13. The non-transitory computer readable medium of claim 12, wherein:
   upon execution by the integrated server remote access controller, the program instructions further cause the integrated server remote access controller to embed the secure token in a new request to the data processing unit for a resource of the baseboard management controller of the data processing unit; and
   upon execution by the data processing unit, the program instructions further cause the data processing unit to:
   parse the secure token for the second layer token;
   check a found second layer token against cached second layer tokens authorizing the data processing unit to the baseboard management controller of the data processing unit and authorizing the baseboard management controller of the data processing unit to the data processing unit; and
   proxy, in response to a match of the found second layer token to a cached second layer token, the new request to the baseboard management controller of the data processing unit using the found second layer token;
   upon execution by the baseboard management controller of the data processing unit, the program instructions cause the baseboard management controller of the data processing unit to process the new request and respond to the new request, back to the data processing unit; and
   upon further execution by the data processing unit, the program instructions further cause the data processing unit to communicate a resulting response to the new request back to the server chassis remote access controller.

14. The non-transitory computer readable medium of claim 12, wherein:
   upon execution by the integrated server remote access controller, the program instructions further cause the integrated server remote access controller to:
   generate an initial token authorizing the integrated server remote access controller to the data processing unit and authorizing the data processing unit to the server chassis remote access controller; and
   embed the initial token in request for a resource of the baseboard management controller of the data processing unit;
   upon execution by the data processing unit, the program instructions further cause the data processing unit to:
   communicate with the baseboard management controller of the data processing unit, to create a bootstrap credential;
   generate the secure token; and
   share the secure token with the integrated server remote access controller for use in direct communications between the integrated server remote access controller and the baseboard management controller of the data processing unit.

15. The non-transitory computer readable medium of claim 14, wherein:
   upon execution by the integrated server remote access controller, the program instructions further cause the integrated server remote access controller to embed the secure token in a new request for a resource from the baseboard management controller of the data processing unit from the integrated server remote access controller to the baseboard management controller of the data processing unit; and
   upon execution by the baseboard management controller of the data processing unit, the program instructions cause the baseboard management controller of the data processing unit to:
   validate the secure token;
   process the new request, in response to validation of the secure token; and
   communicate a resulting response to the new request back to the server chassis remote access controller.

* * * * *